J. R. SIDDALL.
BIRD-CAGE SWING.
No. 173,506.  Patented Feb. 15, 1876.
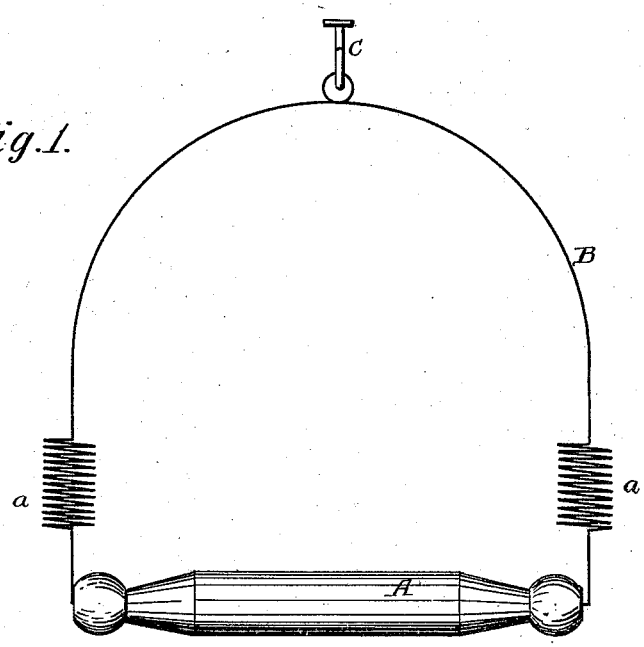
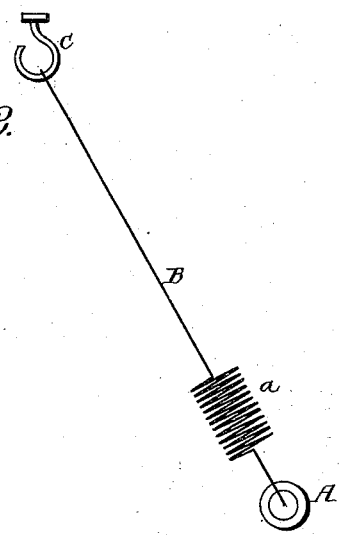
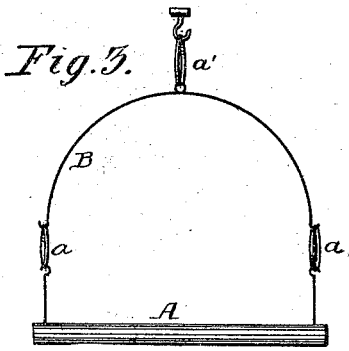
Witnesses: Frank M. Green, Thos. F. Presbry
J. R. Siddall
By his atty
Charles F. Foster

UNITED STATES PATENT OFFICE.

JOEL R. SIDDALL, OF TRENTON, NEW JERSEY, ASSIGNOR TO CHARLES C. GILL, OF WASHINGTON, DISTRICT OF COLUMBIA.

IMPROVEMENT IN BIRD-CAGE SWINGS.

Specification forming part of Letters Patent No. 173,506, dated February 15, 1876; application filed January 17, 1876.

*To all whom it may concern:*

Be it known that I, JOEL R. SIDDALL, of Trenton, Mercer county, New Jersey, have invented an Improved Swing for Bird-Cages, of which the following is a specification:

My invention consists of a swing for bird-cages, constructed as fully described hereafter, to occupy the usual position of a swing at the top of the cage, to afford a yielding rest for the bird, and to prevent the sudden jerks which result during the vibration of the ordinary swings.

In the accompanying drawing, Figure 1 is an external view of my improved bird-swing; Fig. 2, a side view, and Fig. 3 a modification.

A is the usual foot-bar or cross-bar, which, instead of being suspended, as usual, to an unyielding yoke or bail of wire, is connected to the hook or other support C at the top of the cage by an elastic wire bail, B, bent to form two springs, $a\ a$, or through any other elastic medium. For instance, rubber springs $a\ a$, Fig. 3, may replace the springs of wire; or a rubber or other spring, $a'$, may be introduced between the loop and the hook C, by which it is suspended, the object being to obtain a yielding support for the swing-bar A.

When the bar is thus suspended the sudden jerks which ensue as the ordinary swing reaches the limit of its vibrations (sometimes throwing the bird from the bar) are avoided, and a yielding rest provided for the bird.

I claim—

1. As a new article of manufacture, a bird-swing consisting of the transverse bar A and an elastic suspending wire or bail, constructed to be suspended from a single point.

2. The swing-bar A, connected to the top of the cage by an elastic support, as specified.

In testimony whereof I have signed my name to this specification in the presence of two subscribing witnesses.

JOEL R. SIDDALL.

Witnesses:
CHARLES E. FOSTER,
COURTNEY A. COOPER.